United States Patent [19]
Evers et al.

[11] 3,926,807
[45] Dec. 16, 1975

[54] DEVICE FOR THE CONTINUOUS TREATMENT OF LIQUID STREAMS

[75] Inventors: Heinz Evers, Linkenheim; Werner Knoch, Walzbachtal, both of Germany

[73] Assignee: Gesellschaft zur Wiederaufarbeitung von Kernbrennstoffen m.b.H., Leopoldshafen, Germany

[22] Filed: June 22, 1973

[21] Appl. No.: 372,583

[30] Foreign Application Priority Data
June 23, 1972 Germany.............................. 2230714

[52] U.S. Cl. ................ 210/177; 210/186; 210/189; 210/268
[51] Int. Cl............................................. B01d 35/18
[58] Field of Search ...... 23/270 R, 270.5 T; 210/33, 210/71, 80, 177, 186, 189, 268, 285

[56] References Cited
UNITED STATES PATENTS

| | | |
|---|---|---|
| 2,088,497 | 7/1937 | Tijmstra .......................... 23/270.5 T |
| 2,139,943 | 12/1938 | Fenske et al..................... 210/268 X |
| 2,767,140 | 10/1956 | Fitch....................................... 210/33 |
| 3,137,651 | 6/1964 | De Lara et al.................. 210/189 X |
| 3,459,306 | 8/1969 | Kanamori et al. .................. 210/189 |
| 3,554,376 | 1/1970 | Kunz................................... 210/189 |

OTHER PUBLICATIONS
Ion Exchange Separations in Anal. Chem., Samuelson, 1963, pg. 85–86, 93, 201–202.
Journal of Phys. Chem., Bonner et al., Vol. 63, pg. 1420 (1959).

*Primary Examiner*—Samih N. Zaharna
*Assistant Examiner*—Robert G. Mukai
*Attorney, Agent, or Firm*—Spencer & Kaye

[57] ABSTRACT

There are disclosed treatment columns equipped with plates and with heating or cooling jackets, respectively, having counterpressure chambers and devices for the finely dispersed feeding of liquids and further equipped with inlets for regenerated solids at each head of a treatment column, with inlets for transport liquids required for circulation of the solids at each bottom end of a counterpressure chamber, and with outlets at each head of a column and each bottom end of a counterpressure chamber, and with regeneration columns equipped with one or more plates and provided with heating and cooling jackets, with counterpressure chambers, devices for the finely dispersed feeding of eluant and/or regeneration solutions for the elution and or regeneration of solids in the bottom part of each regeneration column, with inlets for the loaded and washed solids in the head of each regeneration column, with inlets for the transport liquids required for circulation of the solids at each bottom end of a counterpressure chamber, with outlets for the solutions eluting the solids at each upper end of a regeneration column, and with outlets at each head of a column and each bottom end of a counterpressure chamber, with valveless connection lines between each bottom end of a counterpressure chamber pertaining to a regeneration column and the head of the neighboring treatment column and, in the reverse direction, between each bottom end of a counterpressure chamber belonging to this treatment column and the head of said regeneration column.

23 Claims, 3 Drawing Figures

DEVICE FOR THE CONTINUOUS TREATMENT OF LIQUID STREAMS

The present invention relates to a device for the continuous treatment of liquid streams with solids continuously circulated in a countercurrent flow.

DT-AS No. 1,517,936 contains a description of a device and a method of fluidized-bed countercurrent flow ion exchange, especially for softening and/or demineralizing water. The device described therein consists of three columns: one loading column, one regeneration column connected with it, and a washing column connected with the latter, all of which are equipped with valve controlled inlet and outlet lines for the liquids to be admitted and to be discharged and for the exchanger material, one counterpressure chamber each being arranged downstream of the loading column and downstream of the washing column, each of them having a tangentially connected liquid feed line.

A device of this type can be used only for the media participating in the countercurrent flow ion exchange process and resulting in the formation of a fluidized bed, i.e., for relatively high throughputs. Lower throughputs below a specific limit necessary for the fluidized bed to be generated, such as are used in processes for the treatment of liquids other than softening and/or demineralization of water, cannot be operated in the device according to DT-AS No. 1,517,936. The surge chambers which must be installed at the head of each column give rise a relatively high space requirement. Another disadvantage connected with the use of this device is the control of the streams of the loaded and the regenerated exchanger materials by throttling and opening, respectively, the relief valve for the regenerating agent.

Therefore, the present invention serves the purpose of creating a device which is universally applicable, which means that it can be used both for the cleaning of liquids, irrespective of the state of aggregation of the impurities contained in it, and for the generation of valuable substances from liquids irrespective of the form in which such valuable substances are present in such liquids. At the same time, this implies that the device can be used both for ion exchange processes with ion exchange material circulation and for sorption-desorption processes and enrichment and/or separation processes, respectively.

According to the present invention, this problem is solved by one or more treatment columns equipped with plates and with heating and cooling jackets, respectively, having counterpressure chambers and devices for the finely dispersed feeding a. of solutions for conditioning the solids carried from top to bottom in these columns prior to their reaction with the liquid streams to be treated in each upper part of a treatment column;

b. of the liquids to be treated in each central part of a treatment column;

c. of washing solutions for the removal of residues of the liquids treated from the solids in each bottom part of a treatment column, with inlets for the regenerated solids at each head of a treatment column, with inlets for the transport liquids required for circulation of the solids at each bottom end of a counterpressure chamber, and with outlets at each head of a column and each bottom end of a counterpressure chamber, and with regeneration columns equipped with one or more plates and provided with heating and cooling jackets, with counterpressure chambers, devices for the finely dispersed feeding of eluant and/or regeneration solutions for the elution and or regeneration of solids in the bottom part of each regeneration column, with inlets for the loaded and washed solids in the head of each regeneration column, with inlets for the transport liquids required for circulation of the solids at each bottom end of a counterpressure chamber, with outlets for the solutions eluting the solids at each upper end of a regeneration column, and with outlets at each head of a column and each bottom end of a counterpressure chamber, with valveless connection lines between each bottom end of a counterpressure chamber pertaining to a regeneration column and the head of the neighboring treatment column and, in the reverse direction, between each bottom end of a counterpressure chamber belonging to this treatment column and the head of said regeneration column.

In an advancement of the present invention the treatment and regeneration columns are designed so as to have conically tapered bottom ends and are connected with counterpressure chambers through gravity tubes with replaceable nozzle tips projecting into these counterpressure chambers. In a preferred embodiment of the present invention, the counterpressure chambers have conically tapered bottom ends and the inlets for the transport liquids are aligned with the respective outlets of the counterpressure chambers into the connection lines.

Moreover, in a preferred embodiment the plates of the columns are helically cut perforated plates bent upwards and the devices for the finely dispersed feeding of liquids and solutions are tubes passing through the heating and cooling jackets, respectively, and the wall of the column and bent upwards in the center of the column with hemispherical attachments equipped with a multitude of perforations. The inlets for the solids at each head of a treatment column and regeneration column, respectively, are arranged underneath the outlets, and the heads of the columns have internal deflectors for the solids.

The device according to the present invention can be operated from relatively low throughputs to flows slightly in excess of the point of discontinuity. It is another advantage of the present invention that the feed of the liquid to be treated and the feeds of the other liquids can be decreased or increased independent of each other and without any change in the rate of the solids circulation. This means that, for instance during operational changes of concentration of the substances to be removed from the liquid to be treated, the device can be kept functioning by simple measures. Hence, it is not necessary, the way it is in water purification systems, to feed aliquots of water already purified in order to dilute the water to be cleaned prior to the cleaning step and thus maintain optimum operating conditions and efficiency.

One major advantage of the present invention is seen in the fact that clearcut loading fronts occur in connection with the action of the specially designed feeding devices so as to avoid fluidization. This also helped by the shape of the plates in the columns and the good distribution of the two media they bring about. In addition, the shape of the column plates favors the possibility of gassing in the columns irrespective of the sorption-desorption phenomena, i.e., the gas generated can be removed quite easily.

The advantageous design of the head of the regeneration column with this specific arrangement of inlets and outlets and the internal deflector for the loaded solids allows most of the transport liquid to be removed. This avoids dilution of the solution containing the eluted substances, which solution leaves the regeneration column below the head. In addition, most of the transport liquid carrying the loaded solids into the regeneration column can be re-used in this way. It is cycled to the inlet at the bottom end of the counterpressure chamber pertaining to that treatment column.

Moreover, the arrangements of inlets and outlets and internal deflectors in the treatment columns and the regeneration columns make these columns more compact and space-saving designs because surge chambers and dead chambers, respectively, are not necessary and will not be provided for.

The device according to the present invention is explained below on the basis of diagrams which, however, are not intended to limit the present invention in any way.

Figure 1:
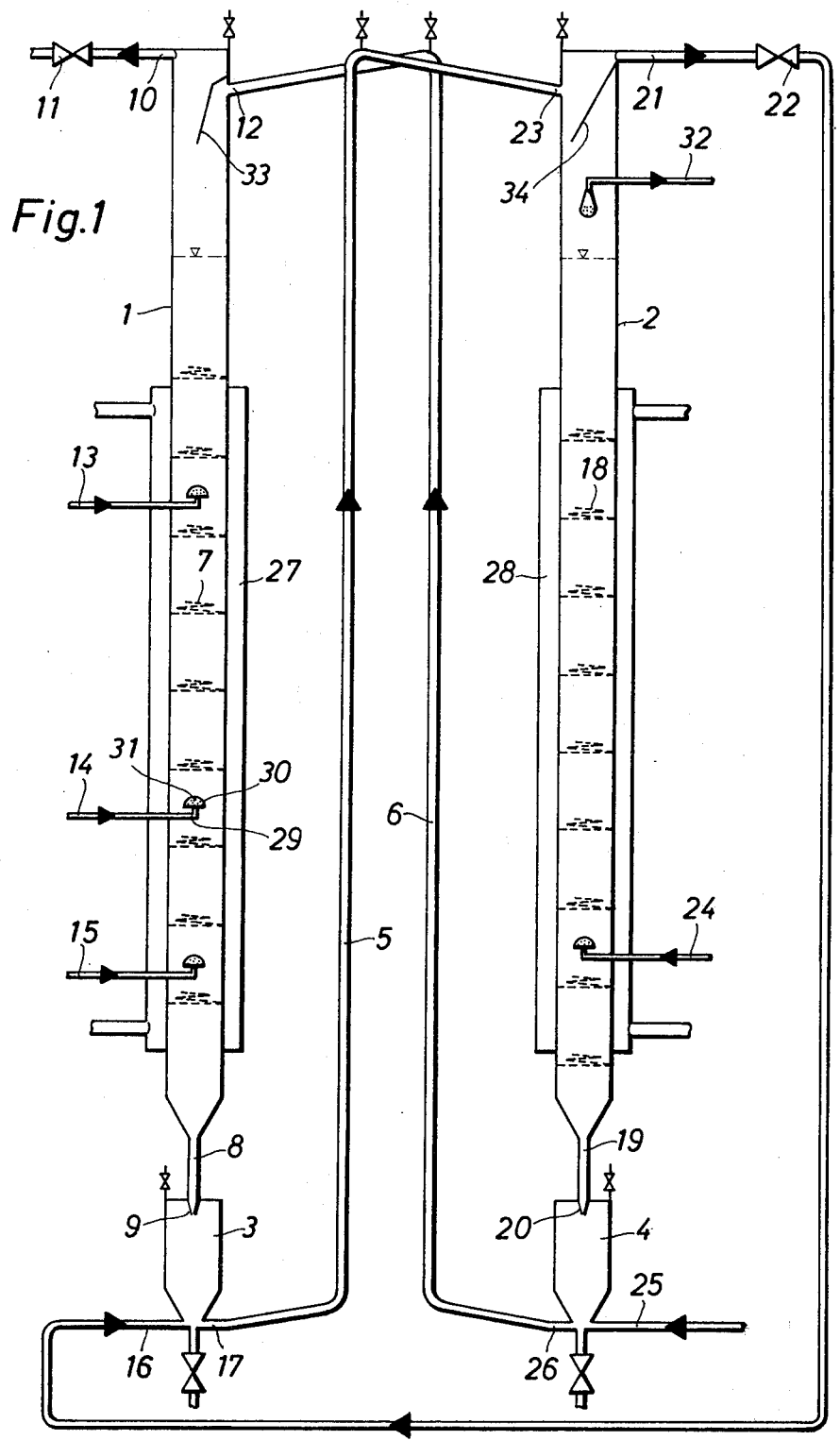
FIG. 1 is a schematic representation of a device consisting of a treatment column and a regeneration column.

The device shown in FIG. 1 consists mainly of a treatment column 1 and a regeneration column 2 with the counterpressure chambers 3 and 4, the valveless connection lines 5 and 6, and the required inlet and outlet lines. The feeding system 14 in the central part of the treatment column 1 feeds the liquid to be treated into the device and runs it through the column from the bottom to the top. The liquid treated with the solids leaves the column 1 through the outlet 10 at the head of the column. The granular solid, which may be present as a granulate, is carried by transport liquid through the connection line 6, through the inlet 12 into the treatment column 1, descending through the column from the top past internal deflector 33 to the bottom into the gravity tube 8 and on through the replaceable tip of the nozzle 9, which can be adapted to such properties of the respective solid as size, shape of grain etc., into the counterpressure chamber 3. While passing through the column in this way the solids, if this is necessary to optimize their effect upon the liquid to be treated, are brought into contact with a conditioning solution in the upper part of the column, which solution is put into the column through the feeding device 13; afterwards, the contact with the liquid to be treated is continued in the central part of the column. In this step the solids are loaded with the materials to be removed from the liquid to be treated. In the range of the column between the feeding system 14 and the feeding system 15 for a washing solution the loaded solids are stripped of residues of the liquid treated. The solids now entering the counterpressure chamber 3 are flushed by a transport liquid introduced through the inlet 16 through the outlet 17 into the connection line 5 and on through the outlet 23 into the regeneration column 2 past internal deflector 34. Here the solids sink from top to bottom in a countercurrent flow relative to the elution and/or regeneration solution through the column into the gravity tube 19 and on into the counterpressure chamber 4 through the replaceable tip of the nozzle 20. In this step the solids pass through the region in column 2 between the outlet 32 for the solution, which has eluted and/or regenerated the solids, and the feeding device 24 for the elution and regeneration solution, respectively, so that when entering the counterpressure chamber 4 they have already discharged the materials removed from the liquid to be treated. The cycle of solids is closed in that transport liquid enters the chamber 4 through the inlet 25, flushing out the solids through the outlet 26 into the connection line 6. In this way the solids are circulated through the columns equipped with plates 7 and 18 almost without any pressure, i.e., without forming any fluidized beds. The plates 7 and 18 are designed as helically cut perforated plates bent upwards and provided with holes whose diameters are larger than the grain size of the solids, preferably about 10 times larger. Each column is equipped with a heating and cooling jacket 27, 28, respectively, which allows the sorption and desorption phenomena occurring in the columns to be optimized by the addition or removal of heat.

The feeding devices 13, 14, 15 and 24 for the finely dispersed feeding of liquids and solutions, as illustrated in FIG. 1 for device 14, each include a tube 29 bent upwards in the center of the column and having a hemispherical attachment 30 equipped with a multitude of perforations (31). Tube 29 penetrates through the heating and cooling jackets and the wall of its column.

The device of the present invention as illustrated in FIG. 1 can be used to clean liquids, for instance metal salt solutions, or to soften or demineralize water by means of ion exchangers, and to extract valuable materials from liquids containing them.

Figure 2:
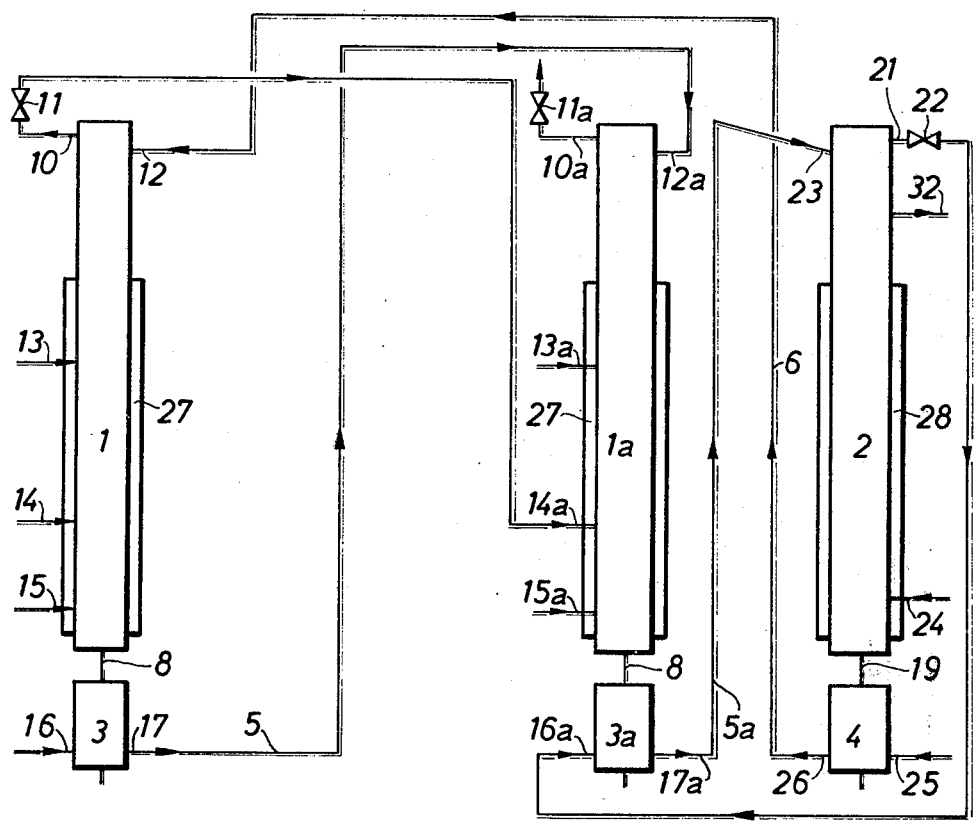
FIG. 2 is a diagram of another embodiment of a device according to the present invention.

FIG. 2 is a simplified diagram of a device in which two treatment columns 1 and 1a are connected in series and column 1a is connected with the regeneration column 2 in the way shown in FIG. 1, with the exception that the connection line 6 is run to the inlet 12 instead of inlet 12a and the connection line 5 is connected to the inlet 12a. The liquid treated in column 1 leaves the column 1 through the outlet 10 and the control valve 11 and is passed through the feeding device 14a into the treatment column 1a.

Figure 3:
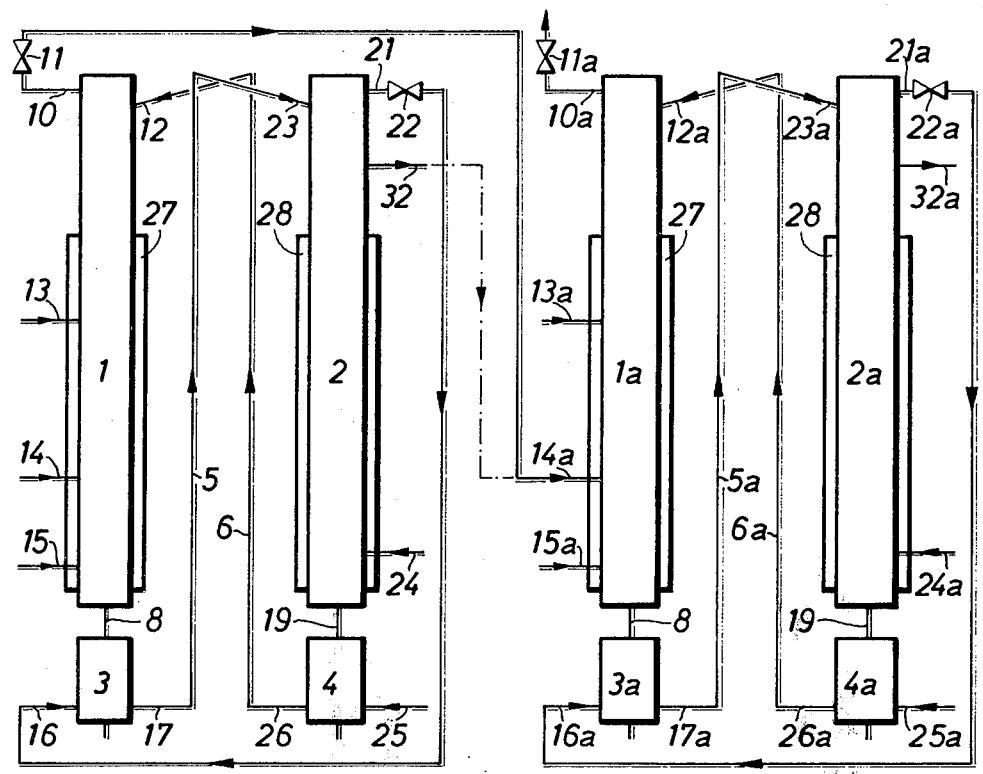
FIG. 3 is a diagram of still another embodiment of a device according to the present invention.

Another example of the device according to the present invention is shown in FIG. 3 in which two treatment columns 1 and 1a and two regeneration columns 2 and 2a are coupled and connected in the way shown in FIG. 1 so that the outlet 10 of the treatment column 1 is connected to the device 14a for feeding the liquid to be treated into the treatment column 1a. A device of this kind can be used, for instance, to extract two different valuable materials consecutively and independent of each other from the same liquid stream.

However, also the outlet 32 for the solution eluting the solids in regeneration column 2 may be connected to the feeding device 14a of the treatment column 1a. In a device of this kind it is possible, for instance, firstly, to remove at least two valuable materials from a liquid to be treated and, secondly, to separate them in another pair of columns by enriching at least one valuable material in the solids circulated through the second pair of columns, thus separating at least one further valuable material which leaves the regeneration column 2a through the outlet 32a.

As a consequence of the wide range of applications of the device according to the present invention said device can be used in the reprocessing of nuclear fuels irradiated in nuclear reactors, i.e., in the final purification stage of the plutonium produced in a solution acidified with nitric acid following extraction, separating of fission products and uranium and re-extraction. For this purpose the plutonium solution acidified with nitric acid as the liquid to be treated is continuously fed into the device and contacted in the treatment column with a suspension of, for instance, a granular ion exchanger continuously flowing from the top to the bottom in a continuous countercurrent flow. Usually, the granulate of synthetic resin is used as the anion exchange material incorporating the plutonium and removing it in a weakly acidified elution solution. Anion exchangers with a grain size of preferably 0.5–1 mm diameter and a specific weight higher than the heaviest liquid to be used is flushed into the treatment column 1 through the inlet 12. For conditioning of the ion exchanger nitric acid, preferably 7 M $HNO_3$, is fed through the feeding device 13, the plutonium solution acidified with nitric acid and to be purified, with an $HNO_3$ concentration of 7 M $HNO_3/l$, is introduced through the feeding device 14, and pure nitric acid of the same concentration is added through the feeding device 15 as a washing solution. The sum total of the quantities of liquid fed in through the lines 12, 13, 14, and 15 equals the amount of plutonium-free nitric acid leaving the column 1 through the outlet 10. This quantity may be up to 60 l/h preferably 15 l/h. For transport of the loaded ion exchanger diluted nitric acid, preferably of 0.6 molarity, is used. In the same way, the elution solution fed into the regeneration column 2 through the feeding device 24 consists of pure 0.6 M nitric acid. This elutes the ion exchanger particles, leaving the column through the outlet 32.

An uneven distribution of the ion exchanger in the two columns 1 and 2 can be balanced simply by increasing or reducing the discharge at the outlet 21 in the head of the regeneration column 2 by means of a control valve 22. If the ion exchange resin accumulates beyond the normal resin level in column 1 during operation, the amount of transport liquid discharged through the outlet 21 is increased, which slightly decreases the pressure in the column 2 and in the counterpressure chamber 3 and allows resin to leave the column 1 at an accelerated rate. At the same time, the discharge of resin is reduced in column 2 because of the reduced pressure in that column so that less resin is supplied to column 1. Conversely, if the resin is too high in column 2, the discharge through the outlet 21 must be throttled. The circulation of the resin suspension leaving the column 2 through the outlet 21 and entering the counterpressure chamber through the inlet 16 can be used to balance irregularities of the flow by means of a single valve and to control the continuous flow while keeping additions constant.

Another example of an application is the purification of a thorium salt solution by means of the embodiment shown in FIG. 1.

The basis of the process is the chemical behavior of thorium and various impurities in solution acidified with nitric acid. In $HNO_3$ solutions (> 7 M) all of the thorium is present as an anion complex, whereas nearly none of the other elements will form soluble anions under these conditions. In diluted $HNO_3$ solutions the anion complex of thorium is decomposed again, forming a cation of Th. Hence, in suitable media thorium can be bound to anion exchange resin as an anion and, in this process, be separated from other ions and desorbed (eluted) by changes of the composition of the solvent.

Columns 1 and 2 are loaded with 20 l of anion exchange resin for this process and brought to the temperature of 60°C by means of preheated water in the heating jackets, which temperature is advantageous for the kinetics of the process.

The process streams are set like this:

Column 1:
    Solution for conditioning the resin, feed through the feeding device 13: 4 l/h; 7 M $HNO_3$
    Feed solution through the feeding device 14: 10 l/h; 7 M $HNO_3$, 10 g Th/l, 0.6 g Zr/l 0.4 g Nb/l (Zr and Nb being the impurities)
    Washing solution through device 15: 6 l/h; 7 M $HNO_3$
    Transport liquid for the circulating resin through inlet 16: 5 l/h; 0.6 M $HNO_3$ Column 2:
    Elution solution for thorium through device 24: 8 l/h; 0.6 M $HNO_3$
    Transport liquid for the circulating resin through inlet 25: 5 l/h; 0.6 M $HNO_3$ The thorium entering at 14 is bound by the resin moving in a countercurrent flow and carried along downward. The impurities, which are bound only weakly or not at all (in this case Zr, Nb), are carried along upward with the washing solution at 15 and removed from the column. The sum total of the streams entering at 13, 14, 15 and 25, which is of 25 l/h with the composition of ~5.7 M $HNO_3$, 0.04 g Zr/Nb per liter, leaves at the outlet 11 of column 1.

The resin loaded with Th leaves the column 1 continuously by means of the transport liquid added at 16 and is added to the column 2 at 23 where it flows in a countercurrent flow relative to the elution solution fed in at 24. This breaks up the Th anion complex, and Th is desorbed by the resin. Th leaves the column at the outlet (product outlet) 32 with a concentration of 12.5 g Th/l and a flow of 8 l/h. The thorium free resin is run to the column 1 from the counterpressure chamber 4 through the outlet 26 and the line 6 by the transport liquid added at the inlet 25.

The process described above can be transferred also to the device shown in FIG. 2. In contrast to FIG. 1, the loading and the washing steps are carried out separately in one column each. The stream at 15 does not exist in this case. Instead, the streams at 14a and 15a in column 1a are used for washing, then leaving the column as waste at 11a.

The application of the device is not restricted to the processes outlined above. It can be used wherever mixtures of substances can be separated because of the different selectivities to the adsorption of individual materials at ion exchangers or other solid adsorbents, e.g., for the separation of uranium and thorium or for the separation of two valencies of an element, such as hexavalent uranium from tetravalent uranium.

Other applications may be the separation of rare earths from each other and the separation of actinides from titanium, zirconium and hafnium.

What we claim is:

1. A device for the continuous treatment of a liquid stream with solids that are continuously circulated from top to bottom in a treatment column in countercurrent flow to the liquid stream comprising:
    a. a treatment column having:
        1. at least one plate;
        2. a heating and cooling jacket;

3. means for finely dispersed feeding of a solution into the upper part of the treatment column for conditioning the solids carried from top to bottom in the treatment column prior to the contact of the solids with the liquid stream to be treated;
4. means for finely dispersed feeding of the liquid to be treated to the central part of the treatment column;
5. means for finely dispersed feeding of a washing solution to the bottom of the treatment column for removing residues of the liquid stream that is treated from the solids;
6. an inlet for regenerated solids at the top of the treatment column;
7. an outlet at the top of the treatment column for removing treated liquid;

b. a first counterpressure chamber connected to the bottom of the treatment column for receiving washed and loaded solids from the treatment column, said first counterpressure chamber including:
1. an inlet at its bottom for receiving a transport liquid required for circulation of the solids out of said first counterpressure chamber;
2. an outlet at its bottom for removal of loaded and washed solids;

c. a regeneration column for regenerating the solids used in the treatment column, said regeneration column including:
1. at least one plate;
2. a heating and cooling jacket;
3. means in the bottom of the column for finely dispersed feeding of a regeneration solution for regenerating the solids;
4. an inlet at the top of the regeneration column for receiving loaded and washed solids;
5. an outlet at the upper end of the regeneration column for the regenerating solution;
6. an outlet for transport liquid at the top of the regeneration column;

d. a second counterpressure chamber connected to the bottom of the regeneration column for receiving regenerated solids from the regeneration column, said second counterpressure chamber including:
1. an inlet at its bottom for receiving a transport liquid which circulates the regenerated solids from the second counterpressure chamber to the treatment column;
2. an outlet at its bottom for removal of the regenerated solids;

e. a first valveless connection line connecting the outlet for regenerated solids at the bottom end of the counterpressure chamber of the regeneration column with the inlet for the solids at the top of the treatment column; and f. a second valveless connection line connecting the outlet for removing solids at the bottom end of the counterpressure chamber of the treatment column with the inlet for the loaded and washed solids at the top of the regeneration column.

2. The device according to claim 1 wherein the treatment and regeneration columns each have a conically tapered bottom end and each column is connected with its counterpressure chamber through a gravity tube having a replaceable nozzle tip which projects into the counterpressure chamber.

3. The device according to claim 1 wherein the first and second counterpressure chambers each have a conically tapered bottom end and in each chamber the inlet for the transport liquid is aligned with the outlet for the removal of solids.

4. The device according to claim 1 wherein the plates of the treatment column and regeneration column are helically cut perforated plates that are bent upwards.

5. The device according to claim 1 wherein the means of paragraphs (a)(3), (a)(4) and (a)(5) each comprise: (i) a tube bent upwards in the center of the treatment column and penetrating through the heating and cooling jacket and the wall of the treatment column, and (ii) a hemispherical attachment on the tube, said attachment having a multitude of perforations; and wherein the means of paragraph (c)(3) comprises: (i) a tube bent upwards in the center of the regeneration column and penetrating through the heating and cooling jacket and the wall of the regeneration column, and (ii) a hemispherical attachment on the tube, said attachment having a multitude of perforations.

6. The device according to claim 1 including an internal solids deflector below the inlet for regenerated solids at the top of the treatment column and an internal solids deflector below the inlet at the top of the regeneration column for receiving loaded and washed solids.

7. The device according to claim 1 wherein the outlet for transport liquid at the top of the regeneration column is connected to said inlet of said first counterpressure chamber.

8. The device according to claim 1 including a further treatment column connected to said treatment column (a) for further treating the treated liquid removed from the outlet of treatment column (a).

9. The device according to claim 8 wherein said further treatment column contains:
1. at least one plate;
2. a heating and cooling jacket;
3. means for finely dispersed feeding of a solution into the upper part of the further treatment column for conditioning the solids carried from top to bottom in the further treatment column prior to the contact of the solids with the treated liquid stream that is to be further treated;
4. means for finely dispersed feeding of the treated liquid that is to be further treated to the central part of the further treatment column;
5. means for finely dispersed feeding of a washing solution to the bottom of the further treatment column for removing residues of the liquid stream that is further treated from the solids;
6. an inlet for solids at the top of the further treatment column;
7. an outlet at the top of the further treatment column for removing treated liquid; said device further including:

g. a third counterpressure chamber connected to the bottom of the further treatment column for receiving washed and loaded solids from the further treatment column, said third counterpressure chamber including:
1. an inlet at its bottom for receiving a transport liquid required for circulation of the solids out of said third counterpressure chamber; and
2. an outlet at its bottom for removal of loaded and washed solids.

10. The device according to claim 9 including:
h. a further regeneration column for regenerating the solids used in the further treatment column, said further regeneration column including:
1. at least one plate;
2. a heating and cooling jacket;
3. means in the bottom of the further regenerating column for finely dispersed feeding of a regeneration solution for regenerating the solids of the further treating column;
4. an inlet at the top of the further regenerating column for receiving loaded and washed solids from the further treating column;
5. an outlet at the upper end of the further regeneration column for the regenerating solution;
6. an outlet for transport liquid at the top of the further regeneration column;

i. a fourth counterpressure chamber connected to the bottom of the further regeneration column for receiving regenerated solids from the further regeneration column, said fourth counterpressure chamber including:
1. an inlet at its bottom for receiving a transport liquid which circulates the regenerated solids from the fourth counterpressure chamber to the further treatment column;
2. an outlet at the bottom of the fourth counterpressure chamber for removal of regenerated solids;

j. a third valveless connection line connecting the outlet for regenerated solids at the bottom end of the fourth counterpressure chamber with the inlet for the solids at the top of the further treatment column; and k. a fourth valveless connection line connecting the outlet at the bottom end of the third counterpressure chamber for removing solids with the inlet for the loaded and washed solids at the top of the further regeneration column.

11. The device according to claim 9 wherein the outlet at the top of the treatment column (a) and the outlet at the upper end of the regeneration column (c) for the regenerating solution are both connected to the means in theh further treatment column for finely dispersed feeding of the treated liquid that is to be further treated.

12. The device according to claim 1 wherein the outlet (c)(6) is above the outlet (c)(5).

13. The device according to claim 1 wherein the inlets (a)(6) and (c)(4) are arranged below the outlets (a)(7)and (c)(6), respectively.

14. A device for the continuous treatment of a liquid stream with solids that are continuously circulated from top to bottom in a treatment column in a countercurrent flow to the liquid stream comprising:
a. a treatment column having:
1. at least one plate;
2. a heating and cooling jacket;
3. means for finely dispersed feeding of a solution into the upper part of the treatment column for conditioning the solids carried from top to bottom in the treatment column prior to the contact of the solids with the liquid stream to be treated;
4. means for finely dispersed feeding of the liquid to be treated to the central part of the treatment column;
5. means for finely dispersed feeding of a washing solution to the bottom of the treatment column for removing residues of the liquid stream that is treated from the solids;
6. an inlet for regenerated solids at the top of the treatment column;
7. an outlet at the top of the treatment column for removing treated liquid;

b. a first counterpressure chamber connected to the bottom of the treatment column for receiving washed and loaded solids from the treatment column, said first counterpressure chamber including:
1. an inlet at its bottom for receiving a transport liquid required for circulation of the solids out of said first counterpressure chamber;
2. an outlet at its bottom for removal of loaded and washed solids;

c. a regeneration column for regenerating the solids used in the treatment column, said regeneration column including:
1. at least one plate;
2. a heating and cooling jacket;
3. means in the bottom of the column for finely dispersed feeding of a regeneration solution for regenerating the solids;
4. an inlet at the top of the regeneration column for receiving loaded and washed solids;
5. an outlet at the upper end of the regeneration column for the regenerating solution;
6. an outlet for transport liquid at the top of the regeneration column;

d. a second counterpressure chamber connected to the bottom of the regeneration column for receiving regenerated solids from the regeneration column, said second counterpressure chamber including:
1. an inlet at its bottom for receiving a transport liquid which circulates the regenerated solids from the second counterpressure chamber to the treatment column;
2. an outlet at its bottom for removal of the regenerated solids;

e. a further treatment column connected to said treatment column (a) for further treating the treated liquid removed from the outlet of treatment column (a), said further treatment column including:
1. at least one plate;
2. a heating and cooling jacket;
3. means for finely dispersed feeding of a solution into the upper part of the further treatment column for conditioning the solids carried from top to bottom in the further treatment column prior to the contact of the solids with the treated liquid stream that is to be further treated;
4. means for finely dispersed feeding of the treated liquid that is to be further treated to the central part of the further treatment column;
5. means for finely dispersed feeding of a washing solution to the bottom of the further treatment column for removing residues of the liquid stream that is further treated from the solids;
6. an inlet for solids at the top of the further treatment column;
7. an outlet at the top of the further treatment column for removing treated liquid; said device further including:

f. a third counterpressure chamber connected to the bottom of the further treatment column for receiving washed and loaded solids from the further treatment column, said third counterpressure chamber including:

1. an inlet at its bottom for receiving a transport liquid required for circulation of the solids out of said third counterpressure chamber; and
2. an outlet at its bottom for removal of loaded and washed solids;

g. a first valveless connection line connecting the outlet for regenerated solids at the bottom end of the counterpressure chamber of the regeneration column with the inlet for the solids at the top of the treatment column (a);

h. a second valveless connection line connecting the outlet for removing solids at the bottom of the counterpressure chamber of the treatment column (a) with the inlet for the loaded and washed solids at the top of the further treatment column (e); and i. a third valveless connection line connecting the outlet for removing solids at the bottom end of the counterpressure chamber of the further treatment column (a) with the inlet for the loaded and washed solids at the top of the regeneration column.

15. The device according to claim 14 wherein the outlet for transport liquid at the top of the regeneration column is connected with the inlet of said third counterpressure chamber.

16. The device according to claim 14 wherein the treatment and regeneration columns each have a conically tapered bottom end and each column is connected with its counterpressure chamber through a gravity tube having a replaceable nozzle tip which projects into the counterpressure chamber.

17. The device according to claim 14 wherein the first, second, and third counterpressure chambers each have a conically tapered bottom end and in each chamber the inlet for the transport liquid is aligned with the outlet for the removal of solids.

18. The device according to claim 4 wherein the plates of the treatment columns and regeneration column are helically cut perforated plates that are bent upwards.

19. The device according to claim 14 wherein the means of paragraphs (a)(3), (a)(4), (a)(5), (e)(3), (e)(4) and (e)(5) each comprise: (i) a tube bent upwards in the center of the treatment column and penetrating through the heating and cooling jacket and the wall of the treatment column, and (ii) a hemi-spherical attachment on the tube, said attachment having a multitude of perforations; and wherein the means of paragraph (c)(3) comprises: (i) a tube bent upwards in the center of the regeneration column and penetrating through the heating and cooling jacket and the wall of the regeneration column, and (ii) a hemispherical attachment on the tube, said attachment having a multitude of perforations.

20. The device according to claim 14 including an internal solids deflector below the inlet for regenerated solids at the top of each treatment column and an internal solids deflector below the inlet at the top of the regeneration column for receiving loaded and washed solids.

21. The device according to claim 14 wherein the outlet at the top of the treatment column (a) and the outlet at the upper end of the regeneration column (c) for the regenerating solution are both connected to the means in the further treatment column for finely dispersed feeding of the treated liquid that is to be further treated.

22. The device according to claim 14 wherein the outlet (c)(6) is above the outlet (c)(5).

23. The device according to claim 14 wherein the inlets (a)(6), (c)(4) and (e)(6) are arranged below the outlets (a)(7), (c)(6) and (e)(7), respectively.

* * * * *